(12) United States Patent
Yoshinari et al.

(10) Patent No.: US 6,333,913 B1
(45) Date of Patent: Dec. 25, 2001

(54) OPTICAL RECORDING MEDIUM AND OPTICAL RECORDING METHOD

(75) Inventors: Jiro Yoshinari; Hiroshi Shingai; Takuya Tsukagoshi, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/412,761

(22) Filed: Oct. 5, 1999

(30) Foreign Application Priority Data

Oct. 6, 1998 (JP) .................................................. 10-299154
Aug. 23, 1999 (JP) .................................................. 11-235970

(51) Int. Cl.$^7$ ...................................................... G11B 3/70
(52) U.S. Cl. .......................... 369/283; 369/100; 369/288; 430/270.13
(58) Field of Search .............................. 369/275.1, 275.2, 369/275.3, 275.4, 275.5, 283, 284, 286, 288, 272, 100; 430/270.11, 270.13, 495.1

(56) References Cited

U.S. PATENT DOCUMENTS 5,978,349 * 11/1999 Yoshinari et al. ................. 369/275.1
6,042,921 * 3/2000 Yoshinari et al. ................. 369/288 X

FOREIGN PATENT DOCUMENTS 5-225603   9/1993   (JP) .
7-37251    2/1995   (JP) .
10-3664    1/1998   (JP) .

OTHER PUBLICATIONS

U.S. application No. 09/433,972, filed Nov. 4, 1999, now U.S. Pat. No. 6,195,326.
U.S. application No. 09/131,865, filed Aug. 10, 1998, now U.S. Pat. No. 6,042,921.

* cited by examiner

*Primary Examiner*—Paul W. Huber
(74) *Attorney, Agent, or Firm*—Oblon, Spivak, McClelland, Maier & Neustadt, P.C.

(57) ABSTRACT

An optical recording medium of phase change type wherein favorable recording/reproducing properties are realized in high density recording, in particular, when the minimum mark length is up to 0.6 $\mu$m and the track pitch is up to 0.7 $\mu$m is provided. An optical recording method wherein high transfer rate is realized in the use of such high density recording medium is also provided. The optical recording medium has a recording layer having a thickness $d_r$ of 10 to 18 nm, and the first dielectric layer comprises one or more unit dielectric layers and the number of the unit dielectric layers is m (m: an integer of 1 or more). The relation:

$$\frac{\lambda}{2} \le \sum_{i=1}^{m} n_i d_i + n_r d_r \le \frac{3\lambda}{4}$$

is satisfied when i-th unit dielectric layer from the substrate has a thickness of $d_i$ and a refractive index of $n_i$ at the recording/reproducing light wavelength of $\lambda$, and the recording layer in its crystalline state has a refractive index of $n_r$. The second dielectric layer has a thickness D in the range of 10 to 50 nm.

14 Claims, 7 Drawing Sheets

OPTICAL RECORDING MEDIUM AND OPTICAL RECORDING METHOD

BACKGROUND OF THE INVENTION

1. Field of the Invention

This invention relates to an optical recording medium of phase change type and a method for recording such an optical recording medium.

2. Prior Art

Highlight is recently focused on optical recording media capable of recording information at a high density and erasing the recorded information for overwriting. One typical overwritable optical recording medium is a phase change type optical recording medium wherein a laser beam is directed to the recording layer to change its crystalline states whereupon a change of reflectance by the crystallographic change is detected for reproduction of the information.

The phase change optical recording media are of great interest since the medium can be overwritten by modulating the intensity of a single laser beam and the optical system of the drive unit used for their operation is simple.

When information is recorded in the optical recording medium of phase change type, the laser beam applied is of the power (recording power) such that the recording layer is heated to a temperature higher than the melting point. In the region where the recording power is applied, the recording layer is melted and thereafter quenched to form an amorphous record mark. When the record mark is erased, a laser beam of the power (erasing power) such that the recording layer is heated to a temperature higher than the crystallizing temperature and lower than the melting temperature is applied. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single laser beam.

In recent years, special attention is being given to rewritable digital video discs (DVD-RAM) wherein a recording film of phase change type is employed. In DVD-RAM Ver. 1.0, data of 2.6 GB is recorded on one side of the disc having a diameter of 120 mm. The recording is conducted in such instance at a recording wevelength of 0.65 $\mu$m, a numerical aperture NA of the optical pick up of 0.60, and a track pitch of 0.74 $\mu$m and with the recording system of land/groove recording and modulation system of 8–16 modulation, and the minimum mark length is 0.62 $\mu$m. Data transfer rate of 11.06 Mbps is attained by adopting the relative linear velocity of the disc in relation to the optical pick up of 6 m/s.

Jpn. J. Appl. Phys. vol.37 (1998) pp.2104–2110 describes ZnS—SiO$_2$ (100 nm)/interface layer (5 nm)/Ge$_2$Sb$_2$Te$_5$ (20 nm)/ZnS—SiO$_2$ (20 nm)/Al Alloy (150 nm) as a film structure by taking the DVD-RAM specification into consideration. It should be noted that the number in the brackets is thickness.

In an optical recording medium of phase change type, recording at a higher recording density and a higher linear velocity is realized by improvements either on the side of the media drive system or on the side of the medium itself. Improvements of the drive system include shortening of the wavelength of the recording laser beam, increase of NA of the optical pick up, and the like, and improvements of the medium include narrowing of the track pitch, shortening of the minimum mark, and the like. Of the improvement on the side of the medium, the narrowing of the track pitch may result in an increased cross erase wherein the record marks on the adjacent track are erased, an increased cross talk wherein the record marks on the adjacent track are read out, and a reduced C/N. Shortening of the minimum mark invites decrease in C/N as well as thermal and waveform interference between the adjacent marks to result in fluctuation in the mark length and increase in the jitter.

In consideration of such situation, the inventors of the present invention have conducted a recording by using the film structure described in Jpn. J. Appl. Phys. vol.37 (1998) pp. 2104–2110 at a recording wavelength of 0.65 $\mu$m and an NA of 0.60 and using the 8–16 modulation system and the land/groove recording as in the case of DVD-RAM, and at a minimum mark length (0.42 $\mu$m) and a track pitch (0.60 $\mu$m) which are shorter than those of DVD-RAM. The jitter properties were unfavorable.

Japanese Patent Application Kokai No. (JP-A) 225603/1993 describes a film structure for use in the high density recording. This film structure comprises a transparent substrate/an undercoat layer/a recording layer/an overcoat layer/a metal reflective layer. The recording layer is a film of a GeSbTe alloy having a thickness of 15 to 30 nm or 30 to 45 nm or 70 to 110 nm. The undercoat layer and the overcoat layer are films of a transparent dielectric material having a refractive index of 1.9 to 2.2, and the undercoat layer is deposited to a thickness of 160 to 220 nm and the overcoat layer is deposited to a thickness of 80 to 160 nm or 200 to 280 nm. This film structure is used for the optical recording at a wavelength of 450 to 670 nm, and there is described in JP-A 225603/1993 that the film structure adopted therein resulted in an increased absorption of the laser beam as well as an increased contrast between the crystalline state and the amorphous state and that a favorable reproduction/erasure of the recorded information was thereby realized. In an Example of JP-A 225603/1993, the mark length at the critical recording density is 0.7 $\mu$m at the recording wavelength of 457.9 nm, and no description is included for the reproduction properties upon recording of the shorter record marks.

In consideration of such situation, the inventors of the present invention have conducted a recording by using the film structure of ZnS—SiO$_2$ (160 nm)/Ge$_2$Sb$_2$Te$_5$ (16 nm)/ZnS—SiO$_2$ (80 nm)/Al Alloy at a recording wavelength of 0.65 $\mu$m and an NA of 0.60 and using the 8–16 modulation system and the land/groove recording as in the case of DVD-RAM, and at a minimum mark length (0.42 $\mu$m) and a track pitch (0.60 $\mu$m) which are shorter than those of DVD-RAM. The jitter properties were unfavorable.

In optical disc systems such as DVD-RAM wherein the recording and the reproduction are conducted by mark edge detecting system using a recording film of phase change type, it is quite important to prevent deformation of the mark shape and insufficient erasure of the record marks. For this, record marks should be formed such that the temperature reached and the cooling rate will be substantially the same at every position in the periphery of the region where the recording film is melted.

In correspondence with the speedup in the digital signal processing, there is a strong demand for a faster recording and reproduction in the information recording system. To meet such demand, increase in the data transfer rate is sought by increasing the relative velocity of the information recording medium in relation to the laser beam. In view of such situation, an information recording method capable of preventing the mark shape deformation and the insufficient record mark erasure are highly awaited.

SUMMARY OF THE INVENTION

An object of the present invention is to provide an optical recording medium of phase change type wherein favorable recording/reproducing properties are realized in high density recording, in particular, when the minimum mark length is up to 0.6 μm and the track pitch is up to 0.7 μm.

Another object of the present invention is to provide an optical recording method wherein high transfer rate is realized in the use of such a high density recording medium.

Such objects are attained by any one of (1) to (14) as described below.

(1) An optical recording medium comprising a substrate, and a first dielectric layer, a recording layer of phase change type, a second dielectric layer, and a reflective layer disposed on the substrate in this order, wherein the recording layer has a thickness $d_r$ in the range of 10 to 18 nm;

the first dielectric layer comprises one or more unit dielectric layers and the number of the unit dielectric layers is m (m: an integer of 1 or more), and the relation:

$$\frac{\lambda}{2} \leq \sum_{i=1}^{m} n_i d_i + n_r d_r \leq \frac{3\lambda}{4}$$

is satisfied when i-th unit dielectric layer from the substrate has a thickness of $d_i$ and a refractive index of $n_i$ at the recording/reproducing light wavelength of λ, and the recording layer in its crystalline state has a refractive index of $n_r$; and the second dielectric layer has a thickness D in the range of 10 to 50 nm.

(2) An optical recording medium according to the above (1) wherein the medium has a recording track pitch of up to 0.7 μm.

(3) An optical recording medium according to the above (1) or (2) wherein the medium has a minimum record mark length of up to 0.6 μm.

(4) An optical recording medium according to any one of the above (1) to (3) wherein the first dielectric layer comprises two or more unit dielectric layers, and the unit dielectric layer of the first dielectric layer in contact with the recording layer has a heat conductivity higher than that of the adjacent unit dielectric layer in contact with the unit dielectric layer in contact with the recording layer.

(5) An optical recording medium according to any one of the above (1) to (4) wherein the second dielectric layer comprises two or more unit dielectric layers, and the unit dielectric layer of the second dielectric layer in contact with the recording layer has a heat conductivity higher than that of the adjacent unit dielectric layer in contact with the unit dielectric layer in contact with the recording layer.

(6) An optical recording medium according to any one of the above (1) to (5) wherein the recording layer contains Ge, Sb and Te as its main components.

(7) An optical recording medium according to any one of the above (1) to (7) wherein at least one of the unit dielectric layers constituting the first dielectric layer contains a mixture of zinc sulfide and silicon oxide as its main component.

(8) An optical recording medium according to any one of the above (1) to (7) wherein the unit dielectric layer of the first dielectric layer in contact with the recording layer and/or the unit dielectric layer of the second dielectric layer in contact with the recording layer contains a nitride or an oxide as its main component.

(9) An optical recording medium according to the above (8) wherein the unit dielectric layer of the first dielectric layer in contact with the recording layer and/or the unit dielectric layer of the second dielectric layer in contact with the recording layer contains silicon nitride, germanium nitride, or chromium oxide as its main component.

(10) An optical recording method for recording the optical recording medium of any one of the above (1) to (9) wherein recording waveform used for modulating the recording laser beam comprises a train of recording pulses and a cooling pulse after the last recording pulse, said cooling pulse being a downward pulse having a power level higher than the power level of the recording pulses and lower than the erasing power.

(11) An optical recording method according to the above (10) wherein the relation:

$$0.8T \leq Tc \leq 2.2T$$

is satisfied when the cooling pulse has a width of Tc and a channel clock of T.

(12) An optical recording method according to the above (11) wherein Tc is an integral multiple of T/2.

(13) An optical recording method according to any one of the above (10) to (12) wherein said optical recording medium has a groove formed on the substrate, and the information is recorded on the groove and the land between two adjacent grooves.

(14) An optical recording method according to any one of the above (10) to (13) wherein the optical recording medium is operated at a relative velocity to the laser beam of at least 6.8 m/s.

DETAILED DESCRIPTION OF THE INVENTION

Optical Recording Medium

Figure 1:
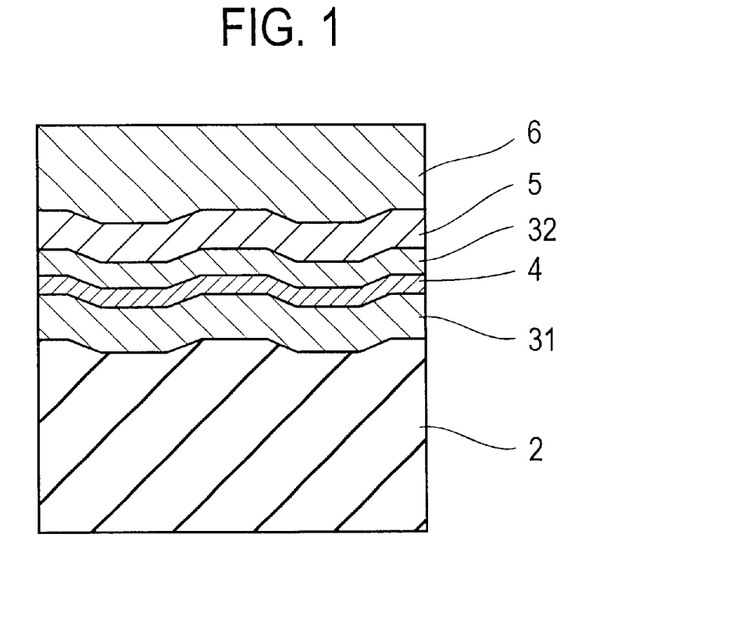
FIG. 1 is a cross sectional view of the optical recording medium according to an embodiment of the present invention.

As shown in FIG. 1, the optical recording medium of the present invention comprises a substrate 2; a first dielectric layer 31, a recording layer 4 of phase change type, a second dielectric layer 32, and a reflective layer 5 disposed on the substrate 2 in this order; and a protective layer 6 is formed on the reflective layer 5. Such structure is similar to the structure of the disc for DVD-RAM as described above.

In the optical recording medium having such film structure, when the first dielectric layer has a thickness of $d_1$, the recording/reproducing beam has a wavelength of $\lambda$, and the refractive index of the first dielectric layer at the wavelength $\lambda$ is $n_1$, reflectance of the optical recording medium generally varies with the increase or decrease in $d_1$ at a cycle of $\lambda/(2n_1)$. In other words, the reflectance varies with the increase or decrease in the light path length $n_1 d_1$ at a cycle of $\lambda/2$. As a consequence, the maximum and the minimum values of the reflectance appear repeatedly with the increase or decrease in the light path length of $\lambda/4$. In view of such situation, the reflectance of an optical recording medium has been generally adjusted by varying the light path length $n_1 d_1$ in the range of $n_1 d_1 < \lambda/4$, $\lambda/4 \leq n_1 d_1 < \lambda/2$, $\lambda/2 \leq n_1 d_1 < 3\lambda/4$ or $3\lambda/4 \leq n_1 d_1 < \lambda$. However, the first dielectric layer with the light path length of $n_1 d_1 < \lambda/4$ could hardly block the heat generated in the recording from the recording layer and the substrate suffered from thermal damage and deformation. On the other hand, unnecessarily thick dielectric layer invites increase in the cost. Therefore, the light path length in the range of $\lambda/4 < n_1 d_1 < \lambda/2$ has generally been adopted.

As a matter of fact, in a disc for DVD-RAM having a single side recording capacity of 2.6 GB, favorable recording/reproducing properties are realized by employing the recording layer having a thickness of at least 20 nm and the light path length $n_1 d_1$ of the first dielectric layer in the range of $\lambda/4 \leq n_1 d_1 < \lambda/2$. However, the inventors of the present invention have experimentally found that, when the recording density is further increased by reducing the minimum mark length to 0.6 $\mu$m or less and the track pitch to 0.7 $\mu$m or less, the DVD-RAM disc of such structure could hardly realize favorable recording/reproducing properties.

In view of such situation, the present invention has enabled to realize favorable recording/reproducing properties even when the recording density is further increased by reducing the minimum mark length to 0.6 $\mu$m or less, and in particular, to 0.55 $\mu$m or less, and the track pitch to 0.7 $\mu$m or less by adjusting the thickness $d_r$ of the recording layer to the range of 10 to 18 nm; $n_1 d_1 + n_r d_r$ to the range of $\lambda/2$ to $3\lambda/4$ when the thickness of the first dielectric layer is $d_1$, the wavelength of the recording/reproducing light is $\lambda$, and the refractive index of the recording layer in its crystalline state at the wavelength of $\lambda$ is $n_r$; and thickness D of the second dielectric layer to the range of 10 to 50 nm. It should be noted that no particular limit is set for the minimum mark length and the track pitch, and the present invention is applicable until the minimum mark length and the track pitch coincides with the limit of optical reproduction.

By reducing the recording layer to a thickness of 10 to 18 nm, the cross erase caused by the reduced track pitch can be suppressed, and the decrease in the C/N and the degree of modulation caused by the reduced record mark length and track pitch is also suppressed. Such cross erase suppression is believed to be realized by the reduced difference in the light absorption between the record marks and the region other than the record marks. On the base of such hypothesis, difference in the light absorption in the case of a thick recording layer and a thin recording layer was simulated by calculation. It should be noted that, in the following simulation, the first dielectric layer and the second dielectric layer comprise ZnS—SiO$_2$, the recording layer comprises a Ge$_2$Sb$_2$Te$_5$ alloy, and the reflective layer comprises an AlCr alloy. Refractive index n at a wavelength of 650 nm and extinction coefficient k of the layers are shown in Table 1. Reflectance and absorption in the crystalline region and the amorphous region of the recording layer were also calculated. The results are shown in Table 2.

TABLE 1

|  | n | k |
| --- | --- | --- |
| ZnS—SiO$_2$ | 2.2 | 0 |
| GeSbTe (crystalline) | 4.44 | 3.48 |
| GeSbTe (amorphous) | 4.13 | 1.73 |
| AlCr | 1.8 | 5.5 |

TABLE 2

| | Thickness (nm) | | | | Crystalline region | | Amorphous region | |
| --- | --- | --- | --- | --- | --- | --- | --- | --- |
| Structure (%) | First dielectric layer | Recording layer | Second dielectric layer | Reflective layer | Reflectance (%) | Absorption (%) | Reflectance (%) | Absorption (%) |
| (a) | 90 | 24 | 20 | 200 | 21.4 | 75.5 | 2.1 | 88.6 |
| (b) | 160 | 16 | 20 | 200 | 22.4 | 72.5 | 3.7 | 82.7 |

Simulation by calculation was also conducted for the cases wherein optical properties were altered without changing the composition of the recording layer but by the change in the conditions of its formation. The optical properties of the recording layer are shown in Table 3, and the reflectance and the absorption of the recording layer are shown in Table 4.

TABLE 3

|  | n | k |
| --- | --- | --- |
| GeSbTe (crystalline) | 3.55 | 3.95 |
| GeSbTe (amorphous) | 3.60 | 1.80 |

TABLE 4

| | Thickness (nm) | | | | Crystalline region | | Amorphous region | |
|---|---|---|---|---|---|---|---|---|
| Structure | First dielectric layer | Recording layer | Second dielectric layer | Reflective layer | Reflectance (%) | Absorption (%) | Reflectance (%) | Absorption (%) |
| (a) | 80 | 24 | 20 | 200 | 22.6 | 74.6 | 1.3 | 89.1 |
| (b) | 170 | 16 | 20 | 200 | 21.3 | 73.5 | 0.4 | 84.9 |

As shown in Tables 2 and 4, the difference in the reflectance between the crystalline region and the amorphous region is equivalent in the structure (a) having a thick recording layer and in the structure (b) having a thin recording layer, while the difference in the absorption is smaller in the structure (b) having a thin recording layer. This in turn means that, when the medium is irradiated with the light of the same power, the structure (b) exhibits smaller absorption in the record mark (amorphous region), and the adjacent record mark is less likely to be erased to result in a reduced cross erase.

In the optical recording system of phase change type, reproduction is conducted by detecting the difference in reflectance between the record mark (which is generally amorphous) and the region other than the record mark (which is generally crystalline). A larger difference in the reflectance results in the higher C/N, and the difference in the reflectance is highly influenced by multiple reflection at interfaces between the multiple layers. As described above, the recording layer of the present invention is to be adjusted to a thickness $d_r$ of from 10 to 18 nm, and the difference in the reflectance should be increased under such conditions. The inventors of the present invention have found that a high C/N is realized when $n_1d_1 + n_rd_r$ is in the range of from $\lambda/2$ to $3\lambda/4$ and the second dielectric layer has a thickness D in the range of 10 to 50 nm when $d_r$ is in the range of 10 to 18 nm. It should be noted that the reflectance of an optical recording medium generally varies with the increase or decrease of $n_1d_1$ at a cycle of $\lambda/2$. However, in the present invention wherein the recording layer has a thickness as thin as 10 to 18 nm, amount of the light reflected from the interface between the recording layer and the second dielectric layer is no longer negligible, and the reflectance periodically varies not with the increase or decrease in $n_1d_1$ but with the increase or decrease in $n_1d_1 + n_rd_r$ at a cycle of $\lambda/2$ as in the case of $n_1d_1$. Therefore, when the design idea as described for the conventional optical recording media is applied, $n_1d_1 + n_rd_r$ should be in the range of $\lambda/4 \leq n_1d_1 + n_rd_r < \lambda/2$ to prevent thermal damage of the substrate and increase in the cost. The inventors of the present invention, however, have found that a high C/N is not realized when $n_1d_1 + n_rd_r$ is in the range of $\lambda/4 \leq n_1d_1 + n_rd_r < \lambda/2$ when $d_r$ is as thin as from 10 to 18 nm, and decrease in the C/N can be suppressed by adjusting $n_1d_1 + n_rd_r$ to the range of $\lambda/2$ to $3\lambda/4$.

The present invention is effective in a wide range of recording/reproducing wavelength. The present invention, however, is most effective when the recording/reproducing wavelength is in the range of from 350 to 700 nm.

Figure 2:
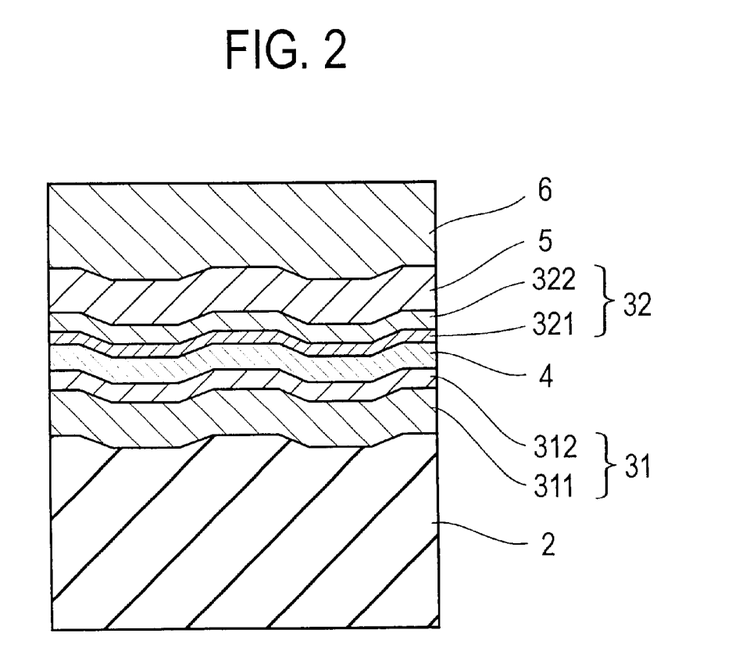
FIG. 2 is a cross sectional view of the optical recording medium according to another embodiment of the present invention.

In the present invention, the first dielectric layer 31 may preferably comprise a double-layer structure of the unit dielectric layers 311 and 312, and the unit dielectric layer 312 in contact with the recording layer 4 is preferably adjusted to have a thermal conductivity higher than that of the unit dielectric layer 311 remote from the recording layer 4 as shown in FIG. 2. The second dielectric layer 32 may preferably have a double-layer structure comprising two unit dielectric layers 321 and 322, and the unit dielectric layer 321 in contact with the recording layer 4 is preferably adjusted to have a thermal conductivity higher than that of the unit dielectric layer 322 remote from the recording layer 4. The unit dielectric layer having such relatively high thermal conductivity may be provided either in one or both of the first dielectric layer 31 and the second dielectric layer 32. Provision of such dielectric layer having a relatively high thermal conductivity in contact with the recording layer has enabled further improvement in the recording/reproducing properties at high density recording. The reasons are described below.

Decrease in the length of the minimum record mark for the purpose of high density recording is associated with a drop in the detection sensitivity. To reduce such drop in the detection sensitivity, the record mark is preferably expanded in the direction of the track width to an extent not to induce an interference with the adjacent track. For such expansion of the record mark, the region which undergo temperature elevation by the recording beam irradiation should be expanded or widened in the in-plane direction of the recording layer, and in particular, in the track width direction, and a good heat diffusion in the in-plane direction of the record mark is required for such record mark expansion. Thermal conductivity of a recording layer, however, is generally low. In view of such situation, a unit dielectric layer having a high thermal conductivity may be disposed in contact with the recording layer to thereby improve heat diffusion in the in-plane direction of the recording layer to enable an improvement in the detection sensitivity of the record mark by record mark expansion. The record mark, however, should be carefully expanded since accurate reading of the record marks will be impossible if the record mark were elongated in the direction of the track length and the record mark length were increased. Widening or expansion of the record mark in the track width direction with no elongation in the track length direction can be realized by controlling the recording beam irradiation pattern.

The unit dielectric layer having a high thermal conductivity disposed in contact with the recording layer may preferably comprise a nitride or an oxide as its main component. More illustratively, such unit dielectric layer may preferably comprise germanium nitride, silicon nitride or chromium oxide as its main component. The unit dielectric layer of high thermal conductivity may preferably have a thickness not exceeding 30 nm since an excessively thick unit dielectric layer will result in a reduced poor recording sensitivity as well as increased cross erase. The unit dielectric layer of high thermal conductivity may preferably have a thickness of at least 1 nm to fully exert the merit of such layer.

The unit dielectric layer of the first or the second dielectric layer in contact with such unit dielectric layer of high thermal conductivity may comprise any material. Such unit dielectric layer, however, may preferably comprise a dielectric material mainly comprising a mixture of zinc sulfide and silicon oxide, namely, a compound generally indicated as ZnS—SiO$_2$. The second dielectric layer, however, may have a single-layer structure solely comprising the unit dielectric layer of high thermal conductivity as described above.

Although the first dielectric layer and the second dielectric layer may generally comprise one or two unit dielectric layers, they may optionally comprise three or more unit dielectric layers. A plurality of unit dielectric layers are disposed not only for the purpose of forming the unit dielectric layers of different thermal conductivity as described above, but also in such a case when an increase in the difference of reflectance between the record marks and the region other than the record marks is required. In such instance, adjacent unit dielectric layers are generally adjusted to have different refractive index. For example, when the adjacent unit dielectric layers are formed from a mixture of zinc sulfide and silicon oxide, mixtures having different mixing ratio of the zinc sulfide and the silicon oxide may be used for each unit dielectric layer to realize such difference in the refractive index. It should be noted that the number m of the unit dielectric layers in the first dielectric layer need not exceed 3 even if the functions as described above were to be simultaneously realized in the first dielectric layer.

The relation with regard to the light path length of the first dielectric layer as described above, namely, the relation: $\lambda/2 \leq n_1 d_1 + n_r d_r \leq 3\lambda/4$ is a relation applicable when the first dielectric layer has a single-layer structure. Such relation may be extended so that the relation:

$$\frac{\lambda}{2} \leq \sum_{i=1}^{m} n_i d_i + n_r d_r \leq \frac{3\lambda}{4}$$

is satisfied when the first dielectric layer comprises one or more unit dielectric layers and the number of the unit dielectric layers is m (m: an integer of 1 or more), and the i-th unit dielectric layer from the substrate has a thickness of $d_i$ and a refractive index of $n_i$ at the recording/reproducing wavelength $\lambda$.

The recording layer comprises a phase change material. In the present invention, the composition of the recording layer is not particularly limited. The present invention, however, is particularly effective when the recording layer comprises a Ge—Sb—Te based system as described below.

When the composition of the Ge—Sb—Te based system of the recording layer is represented by the formula (I):

$$Ge_a Sb_b Te_{1-a-b} \tag{I}$$

a and b are preferably in the range of:

$$0.08 \leq a \leq 0.30$$

$$0.16 \leq b \leq 0.40,$$

and more preferably in the range of:

$$0.08 \leq a \leq 0.25, \text{ and}$$

$$0.20 \leq b \leq 0.40.$$

If the value of a is too small in the formula (I), record marks are more unlikely to crystallize and erasability will be reduced. If the value of a is too large, a large amount of tellurium will bond to germanium to invite separation of antimony and formation of the record marks will be limited.

If the value of b is too small, the content of tellurium will be too much and the record marks are more likely to crystallize when the medium is stored at elevated temperature with a loss of reliability. If the value of b is too large, antimony will precipitate to limit formation of the record marks.

Optical Recording Method

Next, the optical recording method of the present invention is described. The optical recording method of the invention is particularly suitable for using the optical recording medium adapted for high density recording of the present invention at a high linear velocity, and in particular, at a linear velocity of 6.8 m/s or higher. Use of such optical recording method enables tremendous increase in transfer rate. Although no particular upper limit is set for the linear velocity, the medium is preferably used at a linear velocity of up to 15 m/s.

Record marks formed at a low linear velocity is likely to be in the shape of a tear drop. Formation of the record mark of such tear drop shape can be avoided by reducing the cooling rate of the rear portion of the record mark and thereby reducing the width of the rear portion of the record mark. On the contrary, a record mark in the shape of reverse tear drop is likely to be formed at a higher linear velocity. Such formation of the record mark of reverse tear drop shape can be avoided by increasing the cooling rate of the rear portion of the record mark and thereby increasing the width of the rear portion of the record mark.

Figure 3:
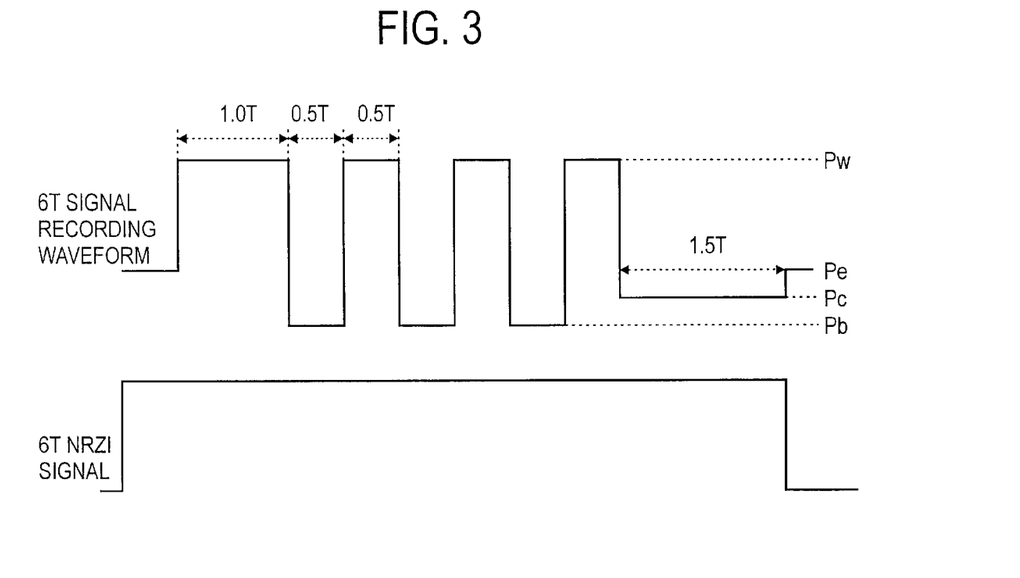
FIG. 3 is a schematic view showing the recording waveform used in the present invention.

In view of such situation, a pulse train is used in the present invention to constitute the recording waveform for forming one record mark and a downward pulse of predetermined power is included after the pulse train. An example of the recording waveform used in the present invention is shown in FIG. 3. The recording pulse train shown in FIG. 3 includes a train of upward recording pulses each having a recording power of Pw. The downward pulses between the recording pulses have a bias power Pb lower than the erasing power Pe. A downward pulse which has a cooling power Pc higher than the bias power Pb and lower than the erasing power Pe is included subsequent to the last recording pulse. This downward pulse is referred herein as the cooling pulse. In FIG. 3, width of the signal is based on a channel clock T. A channel clock is a clock corresponding to the basic clock of the electric signal immediately after the modulator (EFM modulator, 8–16 modulator, and the like). In the embodiment shown in FIG. 3, duration at the recording power Pw and the duration at the bias power Pb are 0.5T except for the top recording pulse.

By including such a cooling pulse, cooling rate of the rear portion of the record mark can be increased, and formation of the record mark in the shape of reverse tear drop at an increased linear velocity can be prevented. Inclusion of such cooling pulse also realizes almost complete erasure of the record mark that is overwritten by the recording mark formed by such waveform, and the jitter is thus reduced. Formation of the record mark of reverse tear drop shape can be prevented by merely including a cooling pulse after the last recording pulse. However, when the cooling power Pc is equivalent to or less than the bias power Pb, the remaining influence of the previous record mark invites increase in the jitter.

In the present invention, the cooling pulse may exist between the recording pulse train for forming one record mark and the subsequent recording pulse train for forming the next record mark. In other words, the power level may be controlled such that the power is reduced immediately after the recording pulse train to the erasing power Pe, and further reduced to the cooling power Pc, and then increased to the erasing power Pe. However, best results may be realized when the cooling pulse is included immediately after the last pulse of the recording pulse train as shown in FIG. 3. It should be noted that the cooling power Pc may be determined in each case by taking the composition of the recording layer, thermal structure of the medium, linear velocity, and other conditions into consideration.

By using such optical recording method, accurate recording without erasing the information of the adjacent tracks is enabled even when the optical recording medium used is a medium of narrow track pitch wherein the track pitch is shorter than the diameter of the recording laser beam, and in particular, an optical recording medium wherein the information is recorded in both the groove and the land.

JP-A 3664/1998 discloses a method for recording an information on an information recording medium by irradiating the medium with a recording energy beam which is modulated at least between high power level and intermediate power level lower than the high power level. In this method, the information is recorded by using a recording waveform including a train of high power pulses and a subsequent downward pulse having a power level lower than the intermediate power level, and width of this downward pulse is altered in correspondence with the relative velocity of the energy beam in relation to the information recording medium. In JP-A 3664/1998, there is described that this information recording method is capable of conducting a high density recording even if the relative velocity were altered. The downward pulse used in JP-A 3664/1998 is the same as the cooling pulse used the present invention in its position subsequent to the last recording pulse of the pulse train. The downward pulse used in JP-A 3664/1998, however, is at a power lower than other downward pulsed of the pulse train. This in turn means that the pulse equivalent to the cooling pulse of the present invention is not disclosed in JP-A 3664/1998. In JP-A 3664/1998, the channel clock T is 36.7 ns when the linear velocity of the information recording disk is 6 m/s, and 24.4 ns when the linear velocity is 9 ms, and 18.3 ns when the linear velocity is 12 m/s. When the minimum mark length in EFM recording was calculated from the values of T, the minimum mark length was 0.66 $\mu$m irrespective of the linear velocity. The inventors of the present invention has retested the recording method of JP-A 3664/1998 and reduced the minimum mark length to 0.6 $\mu$m or less. The jitter is then increased.

Inclusion of a downward pulse after the last pulse of the recording pulse train is also described in JP-A 37251/1995. No embodiment, however, is described in neither JP-A 37251/1995 nor JP-A 3664/1998 wherein the power of the last downward pulse (Pc in the present invention) is higher than the power of other downward pulses in the recording pulse train (Pb in the present invention).

It should be noted that, in the case of forming a short recording mark such as the minimum record mark, the record mark can be formed by using a single recording pulse instead of the recording pulse train. In such a case, the cooling pulse is included after the single recording pulse. A single recording pulse includes no downward pulse of bias power level, and therefore, the cooling power may be determined on the bases of the bias power in the recording pulse train corresponding to the longer record mark.

A high density recording can be conducted under optimal conditions when the product of the cooling pulse irradiation period and the relative velocity of the optical recording medium to the light beam is up to one third of the laser beam spot diameter (distance in recording track direction of the region wherein the laser beam intensity is at least exp(−2) of the intensity at the center of the laser beam) since the deformation of the reproduced signal is minimal in such range. Signal properties will be poor when the product of the cooling pulse irradiation period and the relative velocity of the optical recording medium in relation to the light beam is in excess of one third of the laser beam spot since timing of the erasing power is retarded.

In addition, when the relation:

$$0.8T \leq Tc \leq 2.2T$$

is satisfied, a favorable jitter value is realized and a high density recording can be conducted with the optical recording medium of various cooling rate. The Tc of less than 0.8T invites decrease in the degree of erasure and increase in the jitter, and the Tc higher than 2.2T also invites increase in the jitter.

Use of integral multiples of one half of channel clock T for the purpose of cooling pulse width and the recording pulse width is preferable for reducing the circuit scale of the recording waveform-generating means. Although the benefits of the present invention can be realized even if integral multiples of channel clock T were used for such pulse width, divided pulse having a width smaller the channel clock width is required in view of the situation that generation of a recording pulse having a width smaller than channel clock width is preferable, and use of integral multiples of channel clock T for the pulse width does not contribute to the reduction in circuit scale of the recording wave-generating means. On the other hand, when the integral multiples of T/3, T/4, and other integral fractions with larger denominator were used for the pulse width, pulse width may be optimized at a higher accuracy. Use of such pulse width, however, results in a larger circuit scale.

In the present invention, use of a recording layer wherein crystal grains of a size larger than the crystal grains immediately after the initialization are formed around the amorphous record marks is preferred. Exemplary such recording layers include those containing Ge, Sb and Te as their main components as described above. In such a recording layer, width of the region recrystallized can be readily controlled by the temperature reached and the cooling rate, and the record marks of tear drop shape or reverse tear drop shape are less likely to be formed and variation in the size of the record marks can be suppressed. As a consequence, the signals reproduced will be highly consistent with the recording waveform. The present invention is also applicable to a recording medium wherein the entire region comprises large-sized crystal grains as well as recording media of other properties.

EXAMPLES

Examples of the present invention are given below by way of illustration and not by way of limitation.

Example 1

A substrate 2 in the form of a land/groove double spiral disc having a diameter of 120 mm and a thickness of 0.6 mm was prepared by injection molding polycarbonate. Grooves were simultaneously formed in the injection molding of the substrate 2 to a depth of 65 nm and width of 0.60 $\mu$m at a pitch of 1.20 $\mu$m. On the grooved surface of the substrate 2, there were formed a first dielectric layer 31 of double-layer structure, a recording layer 4, a second dielectric layer 32 of double-layer structure, a reflective layer 5, and a protective layer 6 by the procedure as described below to produce the optical recording disc samples having the structure as shown in FIG. 2.

Of the first dielectric layer 31, the unit dielectric layer 311 which is remote from the recording layer 4 was formed by sputtering in argon atmosphere. The target used was ZnS (80 mol %)—SiO$_2$ (20 mol %). The unit dielectric layer 311 had a thickness d$_1$ of 170 nm and a refractive index n$_1$ (measured at a wavelength of 634 nm) of 2.2.

Of the first dielectric layer 31, the unit dielectric layer 312 in contact with the recording layer 4 was formed by sputtering in argon atmosphere. The target used was Cr$_2$O$_3$. The unit dielectric layer 312 had a thickness d$_2$ of 2 nm and a refractive index n$_2$ (measured at a wavelength of 634 nm) of 2.4.

Figure 5:
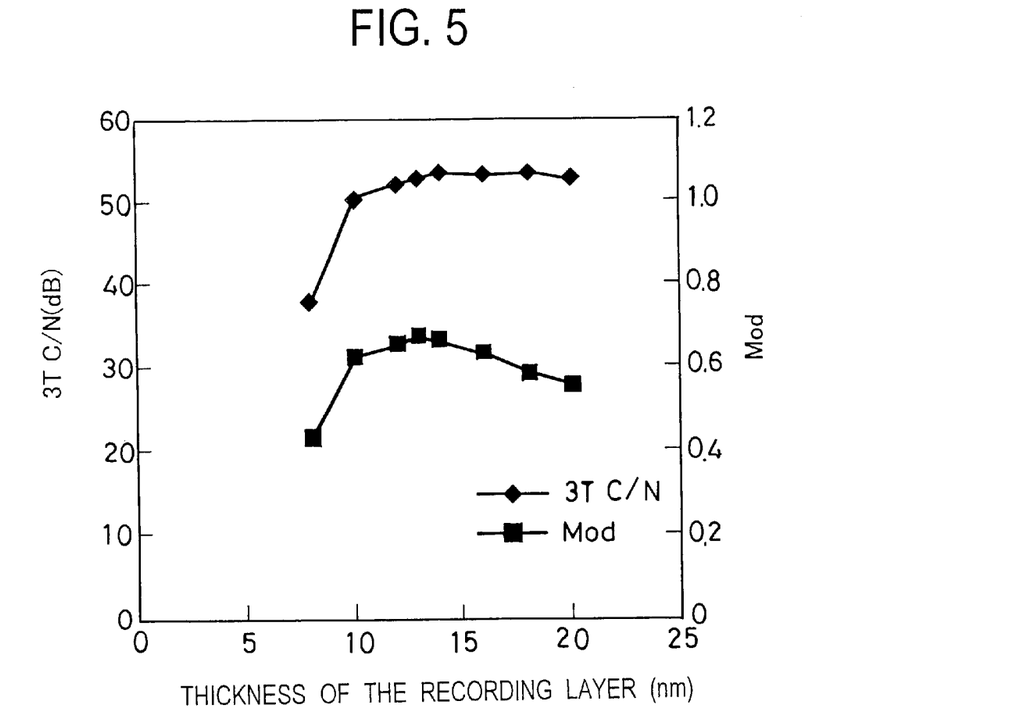
FIG. 5 is a graph showing C/N of 3T signal and degree of modulation in relation to the thickness of the recording layer.
Figure 6:
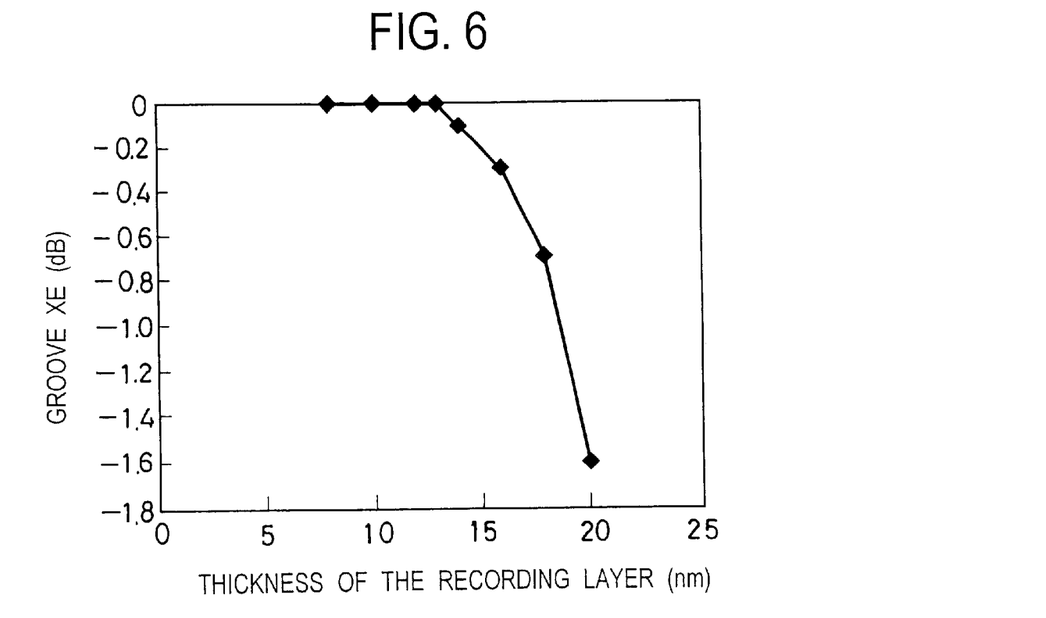
FIG. 6 is a graph showing cross erase in relation to the thickness of the recording layer.

The recording layer 4 was formed by sputtering using Ge$_2$Sb$_2$Te$_5$ for the target. The recording layer had a refractive index n$_r$ (measured at a wavelength of 634 nm) of 3.55. The recording layer of the samples had a thickness d$_r$ as plotted in FIGS. 5 and 6. It should be noted that, in this example, the relation:

$$\lambda/2 \leq n_1 d_1 + n_2 d_2 + n_r d_r \leq 3\lambda/4$$

was satisfied for all of the d$_r$ plotted in FIGS. 5 and 6.

Of the second dielectric layer 32, the unit dielectric layer 321 in contact with the recording layer 4 was formed by sputtering in argon atmosphere. The target used was Cr$_2$O$_3$. The unit dielectric layer 321 was formed to a thickness of 2 nm.

Of the second dielectric layer 32, the unit dielectric layer 322 which is remote from the recording layer 4 was formed by sputtering in argon atmosphere. The target used was ZnS (80 mol %)—SiO$_2$ (20 mol %). The unit dielectric layer 322 was formed to a thickness of 20 nm, and as a consequence, the second dielectric layer 32 had a thickness D of 22 nm.

The reflective layer 5 was formed by sputtering in argon atmosphere using Al-1.7 at % Cr for the target. The reflective layer 5 was formed to a thickness of 200 nm.

The protective layer 6 was formed by applying a UV curable resin by spin coating and exposing it to UV for curing. The protective layer as cured had a thickness of 5 µm.

The thus produced samples were initialized by a bulk eraser, and the initialized samples were evaluated for their properties on an optical recording medium evaluator under the conditions as described below. It should be noted that the record marks were formed on both the land and the groove.

Laser beam wavelength: 634 nm

NA: 0.6

Relative linear velocity: 8.2 m/s

Modulation system: 8–16 modulation

Figure 4:
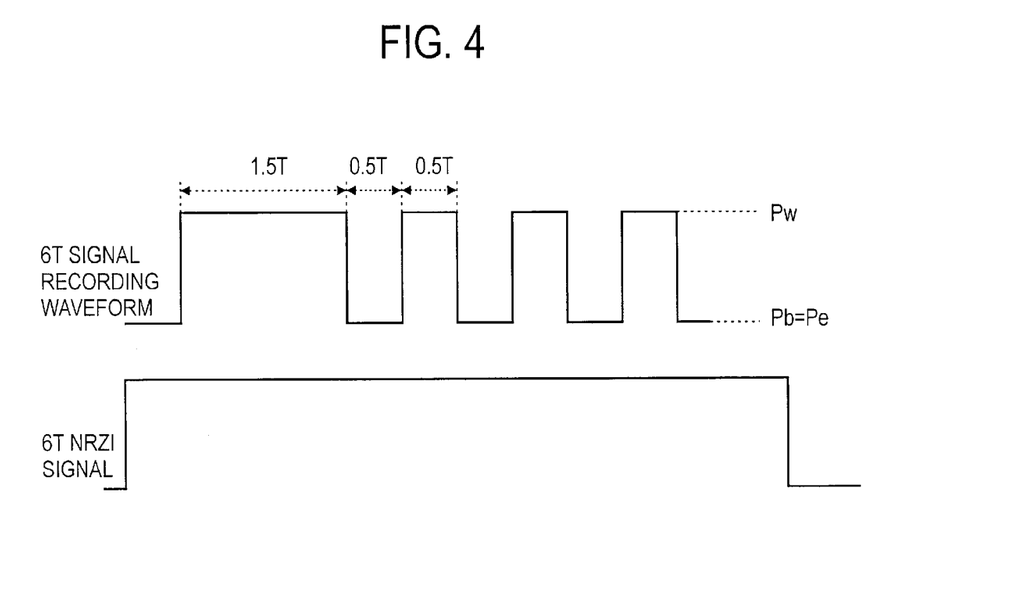
FIG. 4 is a schematic view showing the recording waveform.

Recording waveform (the pattern shown in FIG. 4)
  Recording power Pw: optimal value in each sample
  Erasing power Pe: optimal value in each sample When the medium was recorded under the conditions as described above, the minimum mark length was 0.42 µm. C/N of 3T signal (3T C/N) and degree of modulation (Mod) of the samples are shown in FIG. 5. As shown in FIG. 5, C/N of 3T signal and degree of modulation (Mod) undergo rapid decrease when the thickness d$_r$ of the recording layer is less than 10 nm.

Cross erase (XE) in each sample is shown in FIG. 6. The cross erase was evaluated by recording 11T signal on the track adjacent to the track where 3T signal had been recorded, and measuring the decrease in the carrier of the 3T reproduced signal. The results shown in FIG. 6 demonstrate that the cross erase reduces with the decrease in the thickness d$_r$ of the recording layer, and the medium has no substantial problem in terms of the cross erase when the thickness d$_r$ of the recording layer is up to 18 nm.

As demonstrated in FIGS. 5 and 6, the decrease in the C/N and the degree of modulation as well as the increase in the cross erase due to reduction in the minimum mark length and the track pitch can be suppressed when the thickness d$_r$ of the recording layer is adjusted to the range of 10 to 18 nm.

Example 2

Optical disc samples were prepared by forming the first dielectric layer of double-layer structure, the recording layer, the second dielectric layer of single-layer structure, the reflective layer, and the protective layer on the substrate used in Example 1 by the procedure as described below.

Of the first dielectric layer, the unit dielectric layer which is remote from the recording layer was formed by sputtering in argon atmosphere. The target used was ZnS (80 mol %)—SiO$_2$ (20 mol %). The unit dielectric layer had a refractive index n$_1$ (measured at a wavelength of 638 nm) of 2.2.

Figure 7:
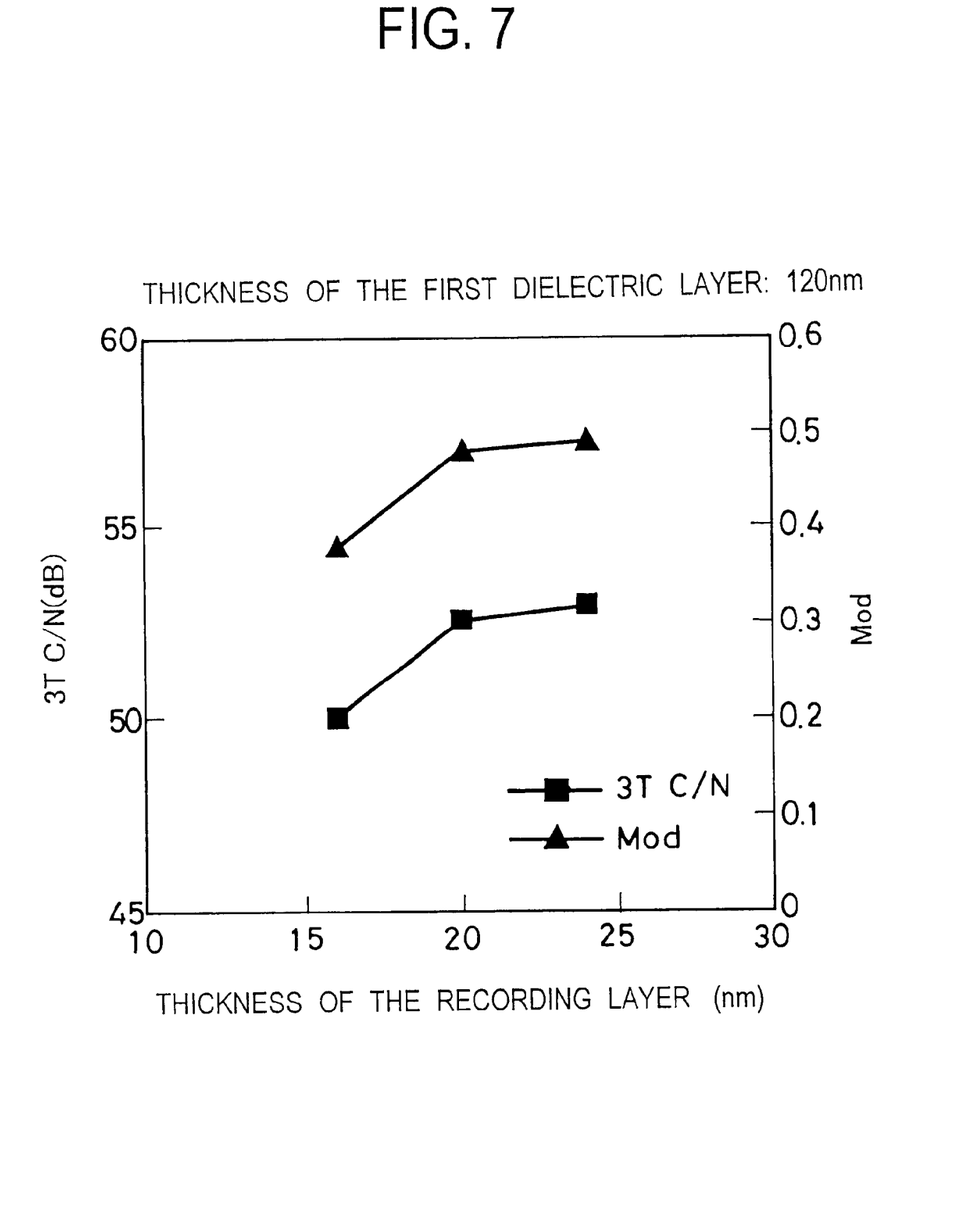
FIG. 7 is a graph showing C/N of 3T signal and degree of modulation in relation to the thickness of the recording layer.
Figure 8:
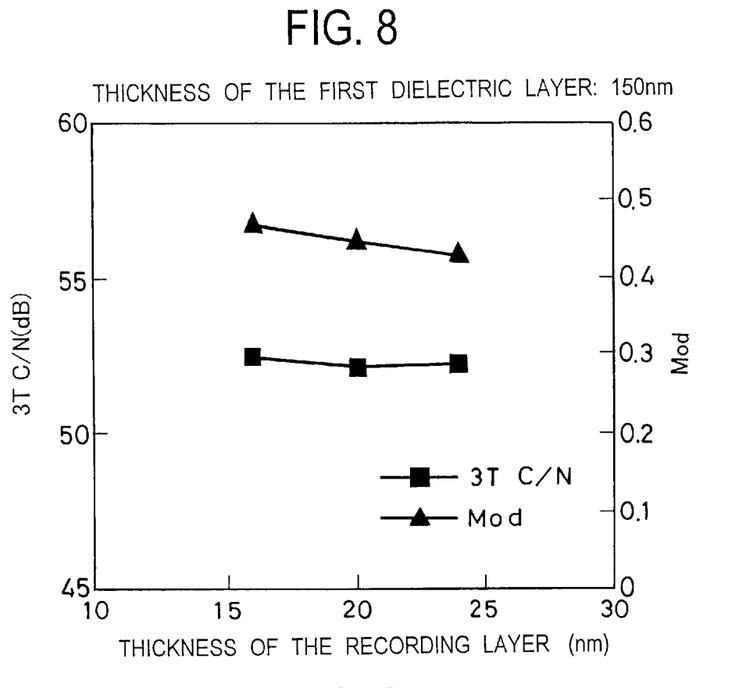
FIG. 8 is a graph showing C/N of 3T signal and degree of modulation in relation to the thickness of the recording layer.
Figure 9:
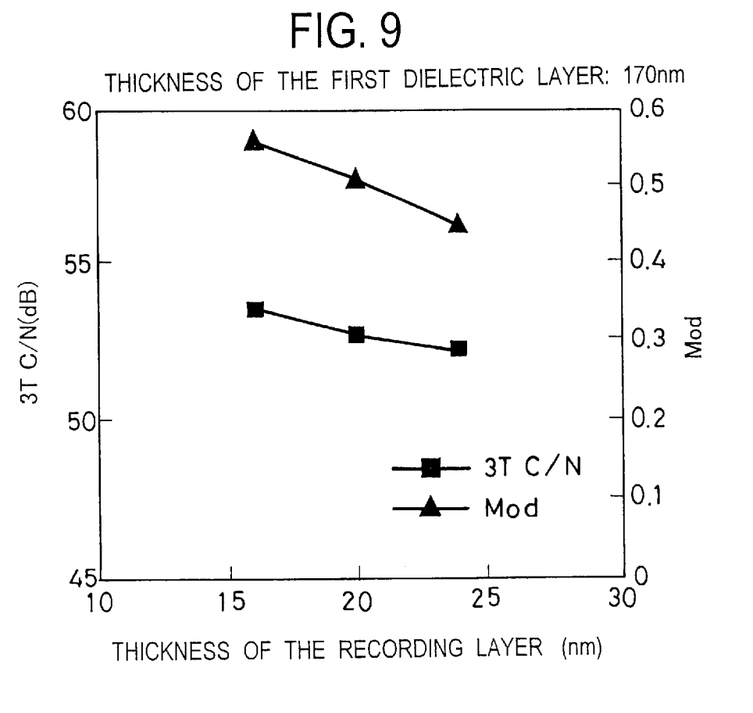
FIG. 9 is a graph showing C/N of 3T signal and degree of modulation in relation to the thickness of the recording layer.

Of the first dielectric layer, the unit dielectric layer in contact with the recording layer was the one comprising Ge$_3$N$_4$, and this layer was formed by reactive sputtering in nitrogen-containing argon atmosphere using a Ge target. The unit dielectric layer had a refractive index n$_2$ (measured at a wavelength of 638 nm) of 2.1. Thickness of the first dielectric layer, namely, sum of the thickness d$_1$ of the unit dielectric layer 311 and the thickness d$_2$ of the unit dielectric layer 312 is indicated in the graphs of FIGS. 7, 8 and 9. In this example, d$_2$ was fixed to 20 nm, and the thickness of the first dielectric layer was varied by varying d$_1$.

The recording layer 4 was formed by sputtering using Ge$_2$Sb$_2$Te$_5$ for the target. The recording layer had a refractive index n$_r$ (measured at a wavelength of 638 nm) of 3.55. The recording layers of the samples had a thickness d$_r$ as plotted in FIGS. 7, 8 and 9.

The second dielectric layer was formed by sputtering in the atmosphere of argon and nitrogen. The target used was ZnS (80 mol %)—SiO$_2$ (20 mol %). The second dielectric layer was formed to a thickness D of 20 nm.

The reflective layer 5 and the protective layer 6 were formed as in the case of Example 1.

The thus produced samples were initialized by a bulk eraser, and the initialized samples were evaluated for their properties on an optical recording medium evaluator under the conditions as described in Example 1 except for the laser beam wavelength of 638 nm.

When the medium was recorded under the conditions as described above, the minimum mark length was 0.42 µm. the C/N of 3T signal (3T C/N) and the degree of modulation (Mod) of the samples are shown in FIGS. 7, 8 and 9.

FIGS. 7, 8 and 9 demonstrate that, when the thickness of the recording layer is in excess of the scope of the present invention (i.e. d$_r$=24 nm), the medium having a thinner recording layer with the d$_1$+d$_2$ of 120 nm (FIG. 7) exhibits better properties while the medium having a thicker recording layer with the d$_1$+d$_2$ of 170 nm (FIG. 9) exhibits better properties when the thickness of the recording layer is within the scope of the present invention (i.e. d$_r$=16 nm). It should be noted that, when d$_r$ was 16 mm, the relation:

$$\lambda/2 \leq n_1 d_1 + n_2 d_2 + n_r d_r \leq 3\lambda/4$$

was not satisfied in FIG. 7, while the relation:

$$\lambda/2 \leq n_1 d_1 + n_2 d_2 + n_r d_r \leq 3\lambda/4$$

was satisfied in FIG. 9. It should be o noted that the relation:

$$\lambda/2 \leq n_1 d_1 + n_2 d_2 + n_r d_r \leq 3\lambda/4$$

was also satisfied in FIG. 8 ($d_1 + d_2 = 150$ nm) when $d_r$ was 16 nm, and C/N of sufficiently high level was realized.

Cross erase property was also measured for the sample having the recording layer with a thickness $d_r$ of 24 nm and the first dielectric layer with a thickness of 120 nm and the sample having the recording layer with a thickness $d_r$ of 16 nm and the first dielectric layer with a thickness of 170 nm. As a result, the cross erase was −2 dB in the sample wherein the $d_r$ was 16 nm while no cross erase was observed in the sample with the $d_r$ of 16 nm.

Example 3

Optical disc samples were prepared by forming the first dielectric layer of double-layer structure, the recording layer, the second dielectric layer of single-layer structure, the reflective layer, and the protective layer on the substrate used in Example 2 by the procedure as described below.

Of the first dielectric layer, the unit dielectric layer which is remote from the recording layer was formed by sputtering in argon atmosphere. The target used was ZnS (80 mol %)—SiO$_2$ (20 mol %). The unit dielectric layer had a refractive index $n_1$ (measured at a wavelength of 634 nm) of 2.2.

Of the first dielectric layer, the unit dielectric layer in contact with the recording layer was the one comprising Ge$_3$N$_4$, and this layer was formed by reactive sputtering in nitrogen-containing argon atmosphere using a Ge target. The unit dielectric layer had a thickness $d_2$ of 10 nm and a refractive index $n_2$ (measured at a wavelength of 634 nm) of 2.1.

The recording layer 4 was formed by sputtering using Ge$_2$Sb$_2$Te$_5$ for the target. The recording layer in crystalline state had a refractive index $n_r$ (measured at a wavelength of 634 nm) of 3.55. The recording layers had a thickness $d_r$ of 13 nm.

The second dielectric layer was formed by sputtering in the atmosphere of argon and nitrogen. The target used was ZnS (80 mol %)—SiO$_2$ (20 mol %). The thickness D of the second dielectric layer was of the values shown in FIG. 10.

The reflective layer was formed by sputtering in argon atmosphere using Ag—1 wt % Pd—1 wt % Cu for the target. The reflective layer was formed to a thickness of 200 nm.

The protective layer was formed as in the case of Example 1.

It should be noted that, in the first dielectric layer of the samples, the thickness $d_1$ of the unit dielectric layer which is remote from the recording layer was adjusted so that the reflectance (after the initialization) at a wavelength of 634 nm was 15%. In this example, the relation:

$$\lambda/2 \leq n_1 d_1 + n_2 d_2 + n_r d_r \leq 3\lambda/4$$

was satisfied for all of the $d_1$ when $\lambda$ was 634 nm.

The thus produced samples were initialized by a bulk eraser, and the initialized samples were evaluated for their properties on an optical recording medium evaluator under the conditions as described in Example 1.

When the medium was recorded under the conditions as described above, the minimum mark length was 0.42 μm. C/N of 3T signal (3T C/N) of the samples is shown in FIG. 10.

Figure 10:
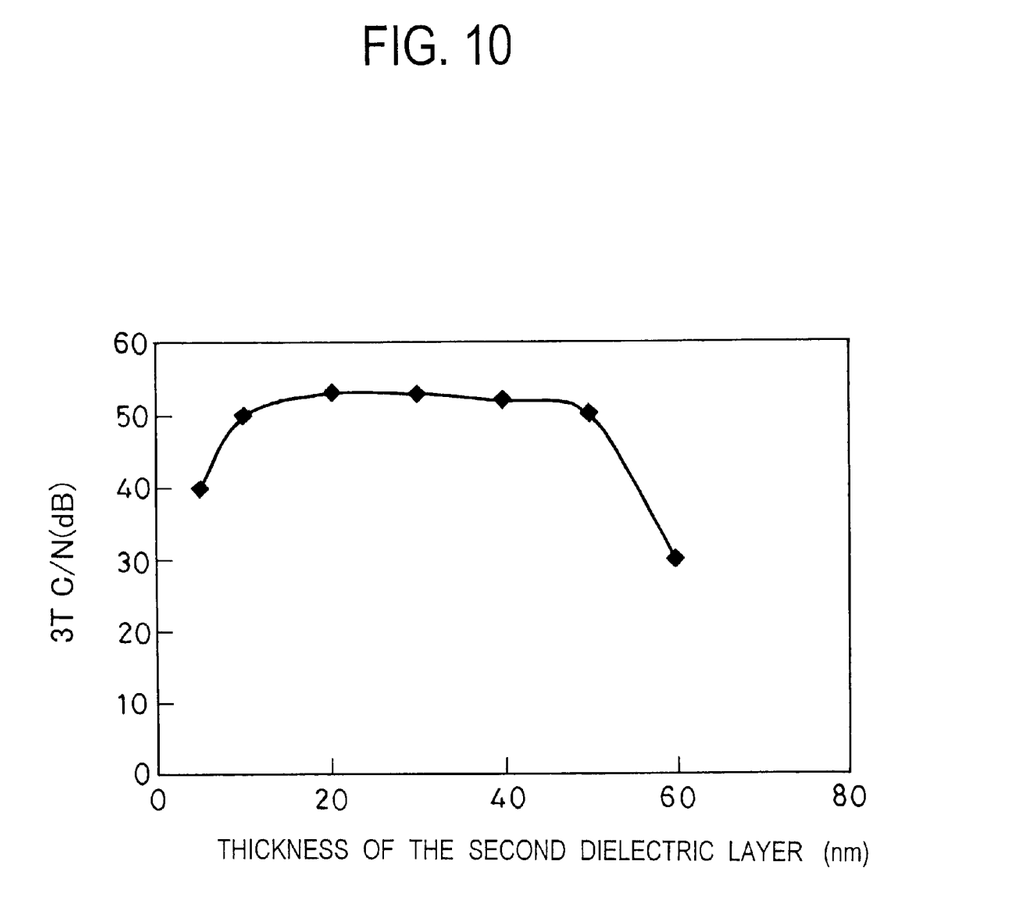
FIG. 10 is a graph showing C/N of 3T signal in relation to the thickness of the second dielectric layer.

As shown in FIG. 10, C/N reduces to a critical level when the thickness D of the second dielectric layer is outside the scope of the present invention. The decrease in C/N when D is too small is caused by the reduced recording sensitivity, while the decrease in C/N when D is too large is caused by the reduced difference in reflectance between the amorphous record mark and the region other than the record mark (which is generally crystalline).

Example 4

Figure 11:
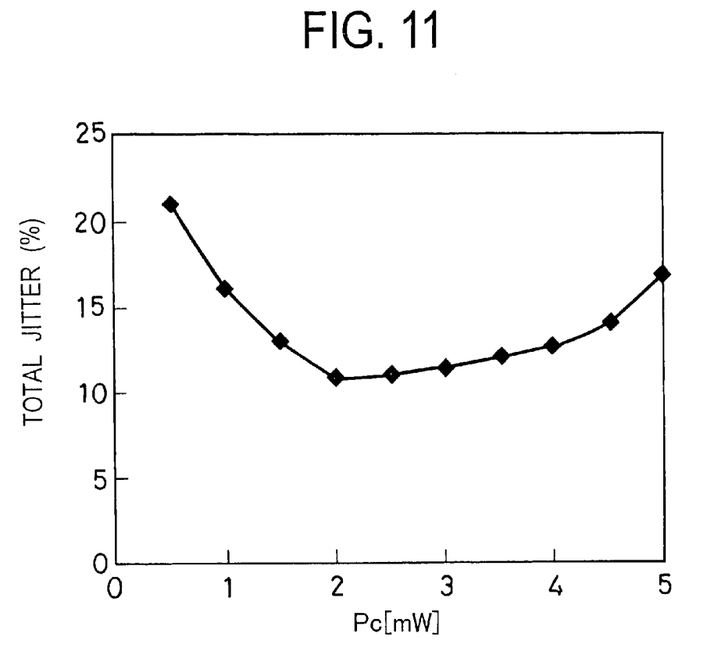
FIG. 11 is a graph showing jitter in relation to cooling power.

Of the samples prepared in Example 1, those wherein the thickness $d_r$ of the recording layer is 16 nm were recorded with 8–16 modulated signal using the recording waveform shown in FIG. 3. The laser beam used was a laser beam having a wavelength of 634 μm. The objective lens of the light pickup had a numerical aperture of 0.6, and the laser beam diameter at the recording layer was about 0.89 μm. The samples were operated at a linear velocity of 8.2 m/s and channel clock T of 17.1 ns. In the recording, Pw was fixed to 11.5 mW, Pb was fixed to 1.0 mW, and Pe was fixed to 4.9 mW, and jitter property was measured by varying the cooling power Pc. The results are shown in FIG. 11. It should be noted that the minimum mark length in this recording was 0.42 μm.

As demonstrated in FIG. 11, the medium exhibited a reduced jitter when Pc was in the range of 1.5 to 4 mW, namely, when the relation Pb<Pc<Pe was satisfied.

Example 5

Figure 12:
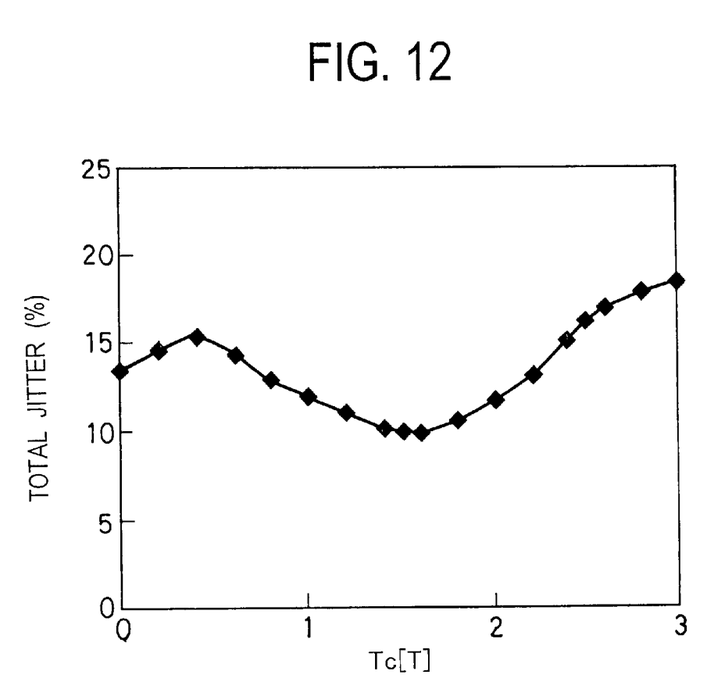
FIG. 12 is a graph showing jitter in relation to width of the cooling pulse.

Jitter property was measured by repeating the procedure of Example 4 except that width Tc of the cooling pulse was incrementally varied from 0 to 2.5 T at an interval of T/2, and Pw was fixed to 11.5 mW, Pb was fixed to 1.0 mW, Pc was fixed to 2.0 mW and Pe was fixed to 4.9 mW in the recording. FIG. 12 shows the jitter in relation to the Tc.

As demonstrated in FIG. 12, the medium exhibited sufficiently reduced jitter when the Tc was in the range of 0.8T≦Tc≦2.2 T, and the jitter was at its minimum at the Tc of 1.5 T.

BENEFITS OF THE INVENTION

The present invention has enabled to realize favorable recording/reproducing properties in a high density optical recording medium wherein the minimum record mark and the track pitch are minimized.

Japanese Patent Application Nos. 299154/1998 and 235970/1999 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium comprising a substrate, and a first dielectric layer, a recording layer of phase change type, a second dielectric layer, and a reflective layer disposed on the substrate in this order, wherein the recording layer has a thickness $d_r$ in the range of 10 to 18 nm;

the first dielectric layer comprises one or more unit dielectric layers and the number of the unit dielectric layers is m (m: an integer of 1 or more), and the relation:

$$\frac{\lambda}{2} \leq \sum_{i=1}^{m} n_i d_i + n_r d_r \leq \frac{3\lambda}{4}$$

is satisfied when i-th unit dielectric layer from the substrate has a thickness of $d_i$ and a refractive index of $n_i$ at the recording/reproducing light wavelength of $\lambda$, and the recording layer in its crystalline state has a refractive index of $n_r$; and the second dielectric layer has a thickness D in the range of 10 to 50 nm.

2. An optical recording medium according to claim 1 wherein the medium has a recording track pitch of up to 0.7 μm.

3. An optical recording medium according to claim 1 wherein the medium has a minimum record mark length of up to 0.6 μm.

4. An optical recording medium according to claim 1 wherein the first dielectric layer comprises two or more unit dielectric layers, and the unit dielectric layer of the first dielectric layer in contact with the recording layer has a heat conductivity higher than that of the adjacent unit dielectric layer in contact with the unit dielectric layer in contact with the recording layer.

5. An optical recording medium according to claim 1 wherein the second dielectric layer comprises two or more unit dielectric layers, and the unit dielectric layer of the second dielectric layer in contact with the recording layer has a heat conductivity higher than that of the adjacent unit dielectric layer in contact with the unit dielectric layer in contact with the recording layer.

6. An optical recording medium according to claim 1 wherein the recording layer contains Ge, Sb and Te as its main components.

7. An optical recording medium according to claim 1 wherein at least one of the unit dielectric layers constituting the first dielectric layer contains a mixture of zinc sulfide and silicon oxide as its main component.

8. An optical recording medium according to claim 1 wherein the unit dielectric layer of the first dielectric layer in contact with the recording layer and/or the unit dielectric layer of the second dielectric layer in contact with the recording layer contains a nitride or an oxide as its main component.

9. An optical recording medium according to claim 8 wherein the unit dielectric layer of the first dielectric layer in contact with the recording layer and/or the unit dielectric layer of the second dielectric layer in contact with the recording layer contains silicon nitride, germanium nitride, or chromium oxide as its main component.

10. An optical recording method for recording the optical recording medium of any one of claims 1 to 9 wherein recording waveform used for modulating the recording laser beam comprises a train of recording pulses and a cooling pulse after the last recording pulse, said cooling pulse being a downward pulse having a power level higher than the power level of the recording pulses and lower than the erasing power.

11. An optical recording method according to claim 10 wherein the relation:

$$0.8T \leq Tc \leq 2.2T$$

is satisfied when the cooling pulse has a width of Tc and a channel clock of T.

12. An optical recording method according to claim 11 wherein Tc is an integral multiple of T/2.

13. An optical recording method according to claim 10 wherein said optical recording medium has a groove formed on the substrate, and the information is recorded on the groove and the land between two adjacent grooves.

14. An optical recording method according to claim 10 wherein the optical recording medium is operated at a relative velocity to the laser beam of at least 6.8 m/s.

* * * * *